(12) United States Patent
Yu

(10) Patent No.: US 10,479,430 B2
(45) Date of Patent: Nov. 19, 2019

(54) BICYCLE SADDLE ASSEMBLY

(71) Applicant: VELO ENTERPRISE CO., LTD., Taichung (TW)

(72) Inventor: Tsai-Yun Yu, Taichung (TW)

(73) Assignee: VELO ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 15/658,778

(22) Filed: Jul. 25, 2017

(65) Prior Publication Data

US 2018/0043955 A1 Feb. 15, 2018

(30) Foreign Application Priority Data

Aug. 11, 2016 (TW) .............................. 105125598 A

(51) Int. Cl.
  *B62J 1/02* (2006.01)
  *B62J 1/00* (2006.01)
  *B62J 1/08* (2006.01)

(52) U.S. Cl.
  CPC ................ *B62J 1/02* (2013.01); *B62J 1/007* (2013.01); *B62J 1/08* (2013.01)

(58) Field of Classification Search
  CPC .................... B62J 1/02; B62J 1/00; B62J 1/08
  See application file for complete search history.

(56) References Cited

U.S. PATENT DOCUMENTS

| | | | |
|---|---|---|---|
| 6,343,836 B1* | 2/2002 | Yu | B62J 1/00 297/195.1 |
| 2004/0145222 A1* | 7/2004 | Shu | B62J 1/00 297/195.1 |
| 2005/0029842 A1* | 2/2005 | Martin | B62J 1/02 297/199 |
| 2009/0108643 A1* | 4/2009 | Yu | B62J 1/00 297/214 |
| 2010/0032996 A1* | 2/2010 | Lee | B62J 1/00 297/195.1 |
| 2010/0164260 A1* | 7/2010 | Segato | B62J 1/02 297/199 |
| 2011/0260510 A1* | 10/2011 | Hsu | B62J 1/08 297/201 |
| 2017/0313373 A1* | 11/2017 | Bigolin | B62J 1/00 |
| 2018/0111653 A1* | 4/2018 | Checchin | B62J 1/08 |

* cited by examiner

*Primary Examiner* — Timothy J Brindley
(74) *Attorney, Agent, or Firm* — Browdy and Neimark, PLLC

(57) ABSTRACT

A bicycle saddle assembly comprises a main body, a suspension member and a supporting rail. The suspension member is disposed between the main body and the suspension rail so that the main body is mounted on a bicycle in an indirect way and, therefore, the bicycle saddle assembly can provide an outstanding suspending performance to reduce shocks and vibrations transmitted to the main body from the seat post of a bicycle.

6 Claims, 4 Drawing Sheets

BICYCLE SADDLE ASSEMBLY

BACKGROUND OF THE INVENTION

1. Field of the Invention

The present invention relates generally to bicycle saddles, and more particularly, to a bicycle saddle assembly which can effectively reduce shocks and vibrations transmitted to the bicycle saddle from the seat post of a bicycle.

2. Description of the Related Art

The conventional bicycle saddles usually have a saddle body and a suspension rail extending along the longitudinal axis of the saddle body and fixed to the underside of the saddle body. The suspension rail is generally secured to a seat post of a bicycle in order to mount the saddle body on the bicycle. The disadvantage of such prior art bicycle saddles is that the suspension rail is directly fixed to the saddle body at an area immediately below the ischial bone of a rider and therefore the localized reaction forces produced by shocks and vibrations transmitting from the seat post of a bicycle will apply on the ischial bone, such as to damage or cause extreme discomfort to the rider. Accordingly, there is a continuing need for a bicycle saddle which can effectively reduce shocks and vibrations transmitted to the bicycle saddle from the seat post of a bicycle.

SUMMARY OF THE INVENTION

Therefore, the present invention is directed to providing a bicycle saddle assembly which provides a suspension member disposed between the saddle body and the suspension rail so that the saddle body is mounted on a bicycle in an indirect way. In other words, the bicycle saddle assembly of the present invention can provide an outstanding suspending performance between the saddle body and the bicycle to overcome the disadvantage of the prior art bicycle saddle.

Accordingly, it is an aspect of the present invention to provide a bicycle saddle assembly which comprises a main body, a suspension member and a supporting rail. The main body includes a relatively narrow anterior portion which fits between a bicycle rider's crotch, a relatively wider posterior portion for supporting a bicycle rider's buttocks, and a longitudinal axis which substantially passes through the relatively narrow anterior portion and the relatively wider posterior portion and divides the relatively wider posterior portion symmetrically into a first region and a second region. The suspension member includes a pair of annulus cushion bases, a connecting device connecting the annulus cushion bases, and a hanging device disposed between the connecting device and the underside of the main body in such a way that one of the annulus cushion bases is located under the first region of the relatively wider posterior portion and away from the underside of the relatively wider posterior portion at a first predetermined interval and the other of the annulus cushion bases is located under the second region of the relatively wider posterior portion and away from the underside of the relatively wider posterior portion at a second predetermined interval. The supporting rail includes a wire device having a first rear end, a second rear end, and a bent front portion. Each of the first and second rear ends of the wire device is coupled respectively on each of the annulus cushion bases and the bent front portion is coupled under the anterior portion of the main body.

The bicycle saddle assembly according to the present invention is also characterized in that each of the annulus cushion bases includes an upper wall, a lower wall, an outer wall, an inner wall and a space defined by the walls in such a way that the stresses applying on the supporting rail during riding will be evenly absorbed by the outer wall and an inner wall of each of the annulus cushion bases.

The bicycle saddle assembly according to the present invention is also characterized in that the first rear end of the wire device is fixed to the lower wall of one of the annulus cushion bases and the second rear end of the wire device is fixed to the lower wall of the other of the annulus cushion bases.

The bicycle saddle assembly according to the present invention is also characterized in that the lower wall of each of the annulus cushion bases has a projection portion extending into the space with a hole therein, and each of the first and second rear ends of the wire device inserts respectively into the hole of the projection portion of the lower wall of each of the annulus cushion bases.

The bicycle saddle assembly according to the present invention is also characterized in that the connecting device includes a flat plate having a first side connected to the inner wall of one of the annulus cushion bases, and a second side connected to the inner wall of the other of the annulus cushion bases.

The bicycle saddle assembly according to the present invention is also characterized in that the hanging device includes an abutment which extends downwardly from a rear end of the underside of the main body and has an open surface connected with an upper surface of the flat plate of the connecting device.

The bicycle saddle assembly according to the present invention is also characterized in that the upper surface of the flat plate of the connecting device has a first rib, a second rib, and a projection between the ribs, the open surface of the abutment of the hanging device has a first groove for receiving the first rib, a second groove for receiving the second rib, and a concave between the grooves for receiving the projection.

BRIEF DESCRIPTION OF THE DRAWINGS

Further characteristics and advantages of the present invention will be apparent from the description of some preferred but non-exclusive embodiments of the present invention, illustrated by way of non-limiting example in the accompanying drawings, in which.

DETAILED DESCRIPTION OF THE INVENTION

With reference to FIG. 1 to FIG. 4, there is shown a bicycle saddle assembly 10 in accordance with the present invention, which generally includes a main body 20, a supporting rail 40, and a suspension member 60.

Figure 4:
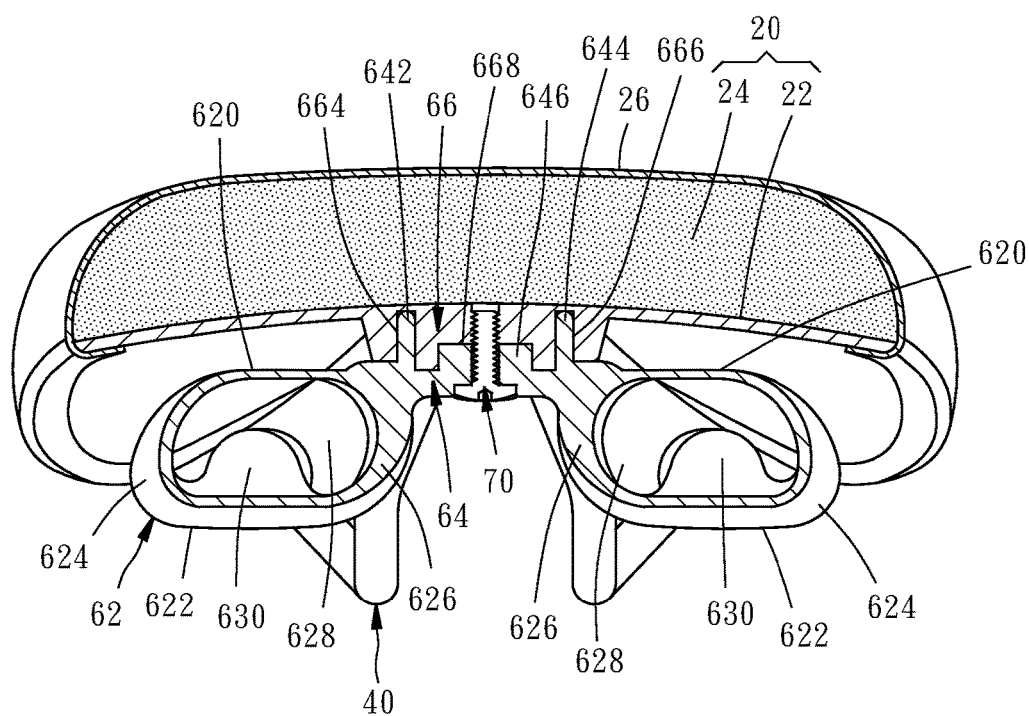
FIG. 4 is a sectional view of the embodiment taken along line 4-4 of FIG. 1.

The main body 20, especially shown in FIG. 4, generally includes a substantially rigid or semi-rigid frame 22 made of plastic or composite materials, a yieldable pad 24 secured to the top surface of the frame 22, and a covering layer 26 superposed to the yieldable pad 24. Alternatively, the main body 20 may only have the frame 22.

Figure 1:
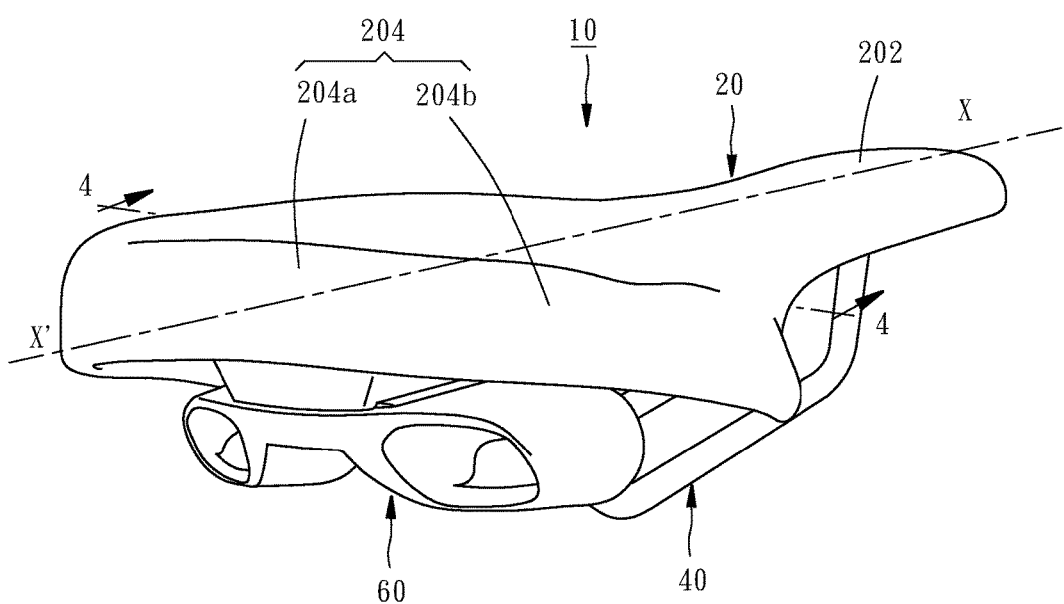
FIG. 1 is a rear perspective view of a preferred embodiment according to the present invention.
Figure 2:
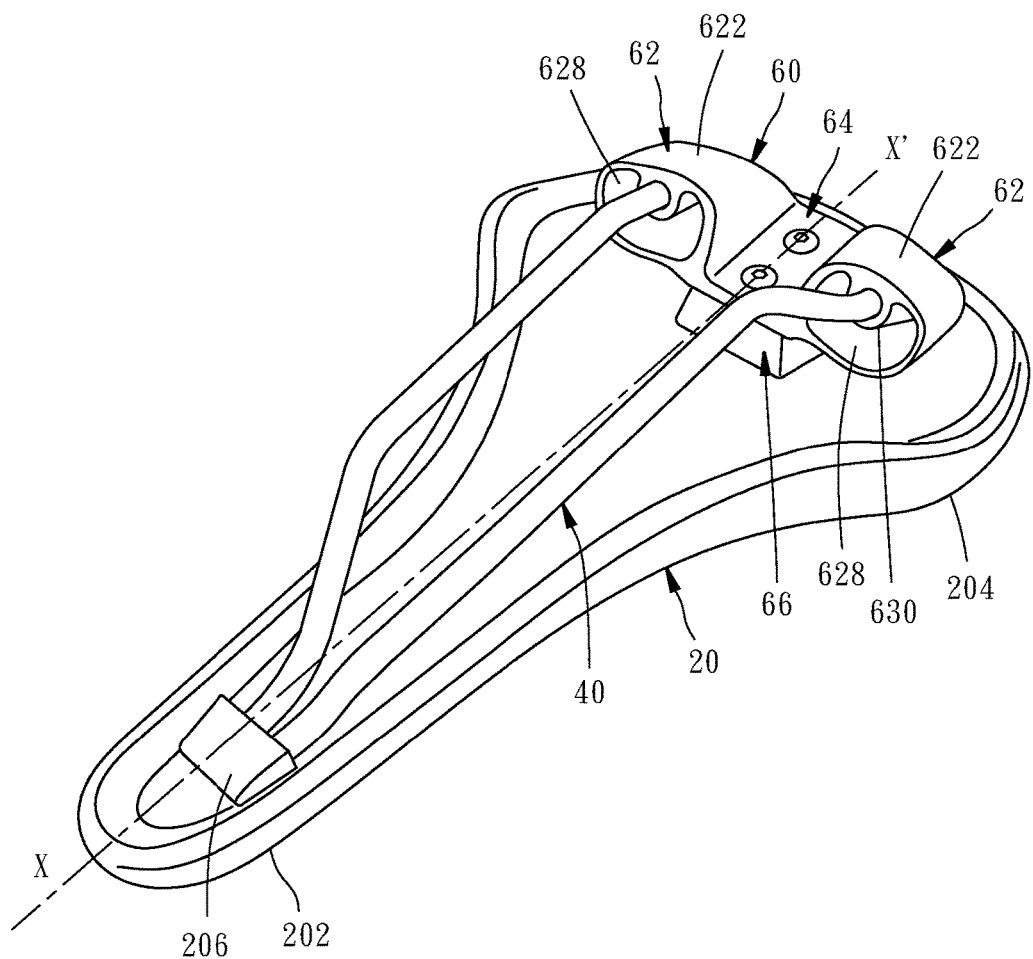
FIG. 2 is a bottom perspective view of the embodiment shown in FIG. 1.
Figure 3:
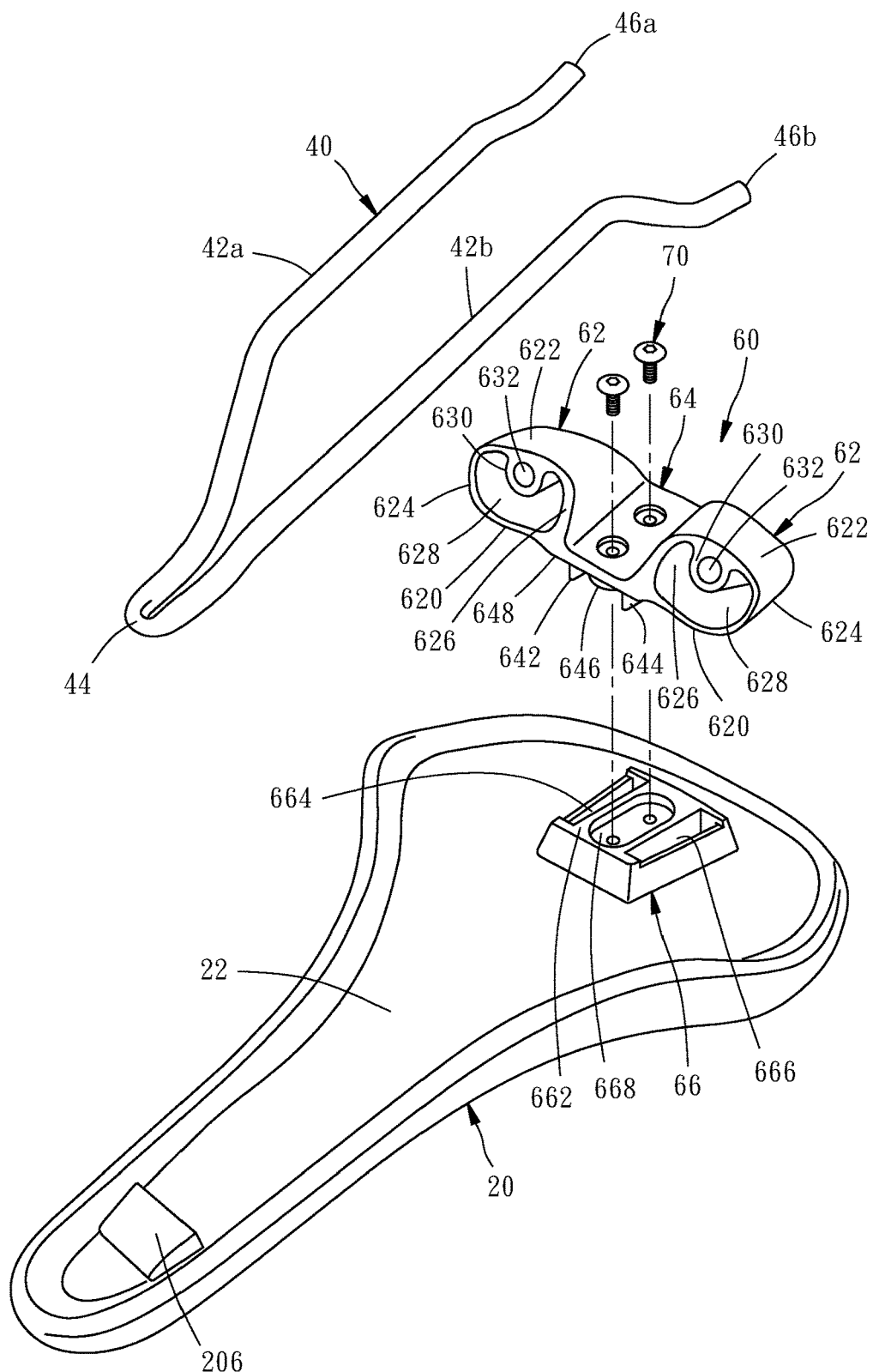
FIG. 3 is an exploded view of the embodiment shown in FIG. 1.

The main body 20 is shaped to have a relatively narrow anterior portion 202 which fits between a bicycle rider's crotch, a relatively wider posterior portion 204 for supporting a bicycle rider's buttocks, and a longitudinal axis X-X' which substantially passes through the relatively narrow anterior portion 202 and the relatively wider posterior portion 204 and divides the relatively wider posterior portion 204 symmetrically into a first region 204a and a second region 204b, as shown in FIG. 1.

The suspension member 60 is made from rigid but elastic materials and includes a pair of annulus cushion bases 62, a connecting device 64, and a hanging device 66.

In this embodiment, each of the annulus cushion bases 62 includes an upper wall 620, a lower wall 622, an outer wall 624, an inner wall 626 and a space 628 defined by the walls. For increasing the elasticity of each annulus cushion base 62, the inner wall 626 and outer wall 624 thereof are curved.

The connecting device 64 is a flat plate having a first side connected to the inner wall 626 of one of the annulus cushion bases 62, and a second side connected to the inner wall 626 of the other of the annulus cushion bases 62.

The hanging device 66 is an abutment being integrally formed with the shell 22 and extending downwardly from a rear end of the underside of the frame 22 at a predetermined height. The hanging device 66 includes an open surface 662 connected with an upper surface 648 of the connecting device 64. Advantageously, the upper surface 648 of the connecting device 64 has a first rib 642, a second rib 644, and a projection 646 disposed between the ribs 642, 644. The open surface 662 of the hanging device 66 has a first groove 664, a second groove 666 and a concave 668 disposed between the grooves 664, 666.

In combination, the first rib 642 is inserted into the first groove 664, the second rib 644 is inserted into the second groove 666, and the projection 646 is received in the concave 668 such that one of the annulus cushion bases 62 is located under the first region 204a of the relatively wider posterior portion 204 and away from the underside of the relatively wider posterior portion 204 at a first predetermined interval and the other of the annulus cushion bases 62 is located under the second region 204b of the relatively wider posterior portion 204 and away from the underside of the relatively wider posterior portion 204 at a second predetermined interval which is equal to the first predetermined interval as shown in FIG. 4. In this embodiment, for having a close and firm combination, the connecting device 64 and the hanging device 66 may be locked together by a plurality of blots 70.

The supporting rail 40 may be made of any suitable material, but preferably a lightweight metal. In this embodiment, the supporting rail 40 is a metal wire which has a pair of center section 42a, 42b, a U-shape front end 44, a first rear end 46a, and a second rear end 46b. The center section 42a, 42b extend along the longitudinal axis X-X' of the main body 20 and parallel with one another with a predetermined distance therebetween for securing the supporting rails 40 to a seat post of a bicycle. Each of the first rear end 46a and second rear end 46b extend respectively from each of center section 42a, 42b along the longitudinal axis X-X' to an area under the wider posterior portion 204. The front end 44 of the rail 40 is attached to the shell 22 by an anterior coupling means underneath the anterior portion 202 of the main body 20. In this embodiment, as shown in the drawings, the anterior coupling means may comprise a socket 206 which is molded directly into the shell 22. The front end 44 of the rail 40 is embedded in the socket 206. Each of the first and second rear ends 46a, 46b is coupled respectively on each of the annulus cushion bases 62. Importantly, in this embodiment, the lower wall 622 of each of the annulus cushion bases 62 has a projection portion 630 extending into the space 628 with a hole 632 molded directly into the lower wall 622, and each of the first and second rear ends 46a, 46b is inserted respectively into the hole 632 of the projection portion 630.

It should be appreciated that when the bicycle saddle assembly 10 is mounted to the seat post of a bicycle, as shown in FIG. 4, each of the first region 204a and second region 204b of the main body 20 is separated from each of the annulus cushion bases 62 by a predetermined interval, in other words, the supporting rail 40 is attached to the main body 20 in an indirect way, so that shocks and vibrations transmitted to the main body 20 from the seat post of a bicycle can be effectively reduced. Advantageously, since each of the annulus cushion bases 62 is constructed to have the outer wall 624, an inner wall 626 and each of the first and second rear ends 46a, 46b is coupled respectively on the lower wall 622 of each of the annulus cushion bases 62, so that during riding, the stresses applying on the supporting rail 40 will be evenly absorbed by the outer wall 624 and an inner wall 626 of each of the annulus cushion bases 62.

What is claimed is:

1. A bicycle saddle assembly comprising:
    a main body including a relatively narrow anterior portion which fits between a bicycle rider's crotch, a relatively wider posterior portion for supporting a bicycle rider's buttocks, and a longitudinal axis which substantially passes through the relatively narrow anterior portion and the relatively wider posterior portion and divides the relatively wider posterior portion symmetrically into a first region and a second region;
    a suspension member including a pair of annulus cushion bases, a connecting device connecting the annulus cushion bases, and a hanging device disposed between the connecting device and the underside of the main body in such a way that one of the cushion bases is located under the first region of the relatively wider posterior portion and away from the underside of the relatively wider posterior portion at a first predetermined interval and the other of the annulus cushion bases is located under the second region of the relatively wider posterior portion and away from the underside of the relatively wider posterior portion at a second predetermined interval; and
    a supporting rail for mounting the main body to a bicycle, the rail comprising a wire device having a first rear end, a second rear end, and a bent front portion, with each of the first and second rear ends being coupled respectively on each of the first and second annulus cushion bases and the bent front portion being coupled under the anterior portion of the main body,
    wherein each of the annulus cushion bases includes an upper wall, a lower wall, an outer wall, an inner wall and a space defined by the walls in such a way that the stresses applying on the supporting rail during riding will be evenly absorbed by the outer wall and the inner wall of each of the annulus cushion bases,
    wherein the first rear end of the wire device is fixed to the lower wall of one of the annulus cushion bases and the second rear end of the wire device is fixed to the lower wall of the other of the annulus cushion bases, and wherein the lower wall of each of the annulus cushion bases has a projection portion extending into the space with a hole therein, and each of the first and second rear ends of the wire device inserts respectively into the hole of the projection portion of the lower wall of each of the annulus cushion bases.

2. The bicycle saddle assembly of claim 1, wherein the inner and outer walls are curved.

3. The bicycle saddle assembly of claim 1, wherein the connecting device includes a flat plate having a first side connected to the inner wall of one of the annulus cushion bases, and a second side connected to the inner wall of the other of the annulus cushion bases.

4. The bicycle saddle assembly of claim 3, wherein the hanging device includes an abutment extending downwardly from a rear end of the underside of the main body and having an open surface connected with an upper surface of the flat plate of the connecting device.

5. The bicycle saddle assembly of claim 4, wherein the abutment is integrally formed with the main body.

6. The bicycle saddle assembly of claim 4, wherein the upper surface of the flat plate of the connecting device has a first rib, a second rib, and a projection between the ribs, the open surface of the abutment of the hanging device has a first groove for receiving the first rib, a second groove for receiving the second ribs, and a concave between the grooves for receiving the projection.

\* \* \* \* \*